United States Patent
Kornacker et al.

(10) Patent No.: US 11,630,830 B2
(45) Date of Patent: Apr. 18, 2023

(54) BACKGROUND FORMAT OPTIMIZATION FOR ENHANCED QUERIES IN A DISTRIBUTED COMPUTING CLUSTER

(71) Applicant: Cloudera, Inc., Palo Alto, CA (US)

(72) Inventors: Marcel Kornacker, Oakland, CA (US); Justin Erickson, San Francisco, CA (US); Nong Li, San Francisco, CA (US); Lenni Kuff, San Francisco, CA (US); Henry Noel Robinson, San Francisco, CA (US); Alan Choi, Palo Alto, CA (US); Alex Behm, San Francisco, CA (US)

(73) Assignee: Cloudera Inc., Santa Clara, CA (US)

( * ) Notice: Subject to any disclaimer, the term of this patent is extended or adjusted under 35 U.S.C. 154(b) by 0 days.

(21) Appl. No.: 16/921,558

(22) Filed: Jul. 6, 2020

(65) Prior Publication Data

US 2020/0334247 A1  Oct. 22, 2020

Related U.S. Application Data

(63) Continuation of application No. 15/292,053, filed on Oct. 12, 2016, now Pat. No. 10,706,059, which is a continuation of application No. 14/043,753, filed on Oct. 1, 2013, now Pat. No. 9,477,731.

(51) Int. Cl.
*G06F 16/2458* (2019.01)
*G06F 16/25* (2019.01)
*G06F 16/27* (2019.01)
*G06F 16/2453* (2019.01)

(52) U.S. Cl.
CPC .... *G06F 16/2471* (2019.01); *G06F 16/24542* (2019.01); *G06F 16/258* (2019.01); *G06F 16/27* (2019.01)

(58) Field of Classification Search
None
See application file for complete search history.

(56) References Cited

U.S. PATENT DOCUMENTS

| | | | |
|---|---|---|---|
| 5,325,522 | A | 6/1994 | Vaughn |
| 5,634,053 | A | 5/1997 | Noble et al. |
| 5,825,877 | A | 10/1998 | Dan et al. |
| 6,463,433 | B1 | 10/2002 | Baclawski |
| 6,651,242 | B1 | 11/2003 | Hebbagodi et al. |
| 6,678,828 | B1 | 1/2004 | Pham et al. |

(Continued)

OTHER PUBLICATIONS

"Hadoop: The Definitive Guide, 2nd Edition" copyright 2011 Tom White.

(Continued)

*Primary Examiner* — Christopher J Raab
(74) *Attorney, Agent, or Firm* — Perkins Coie LLP (57) ABSTRACT

A format conversion engine for Apache Hadoop that converts data from its original format to a database-like format at certain time points for use by a low latency (LL) query engine. The format conversion engine comprises a daemon that is installed on each data node in a Hadoop cluster. The daemon comprises a scheduler and a converter. The scheduler determines when to perform the format conversion and notifies the converter when the time comes. The converter converts data on the data node from its original format to a database-like format for use by the low latency (LL) query engine.

20 Claims, 5 Drawing Sheets

(56) References Cited

U.S. PATENT DOCUMENTS

| | | | |
|---|---|---|---|
| 6,931,530 B2 | 8/2005 | Pham et al. | |
| 7,031,981 B1 | 4/2006 | Deluca et al. | |
| 7,107,323 B2 | 9/2006 | Hara et al. | |
| 7,143,288 B2 | 11/2006 | Pham et al. | |
| 7,325,041 B2 | 1/2008 | Hara et al. | |
| 7,577,900 B2 | 8/2009 | Passero et al. | |
| 7,818,313 B1 | 10/2010 | Tsimelzon et al. | |
| 7,831,991 B1 | 11/2010 | Kiraly | |
| 7,984,043 B1* | 7/2011 | Waas | G06F 16/8358 |
| | | | 707/718 |
| 8,024,560 B1 | 9/2011 | Alten | |
| 8,260,803 B2 | 9/2012 | Hsu et al. | |
| 8,260,826 B2 | 9/2012 | Chen et al. | |
| 8,306,919 B2 | 11/2012 | Sakamura et al. | |
| 8,543,538 B2 | 9/2013 | Frantz et al. | |
| 8,631,403 B2 | 1/2014 | Soundararajan et al. | |
| 8,655,939 B2 | 2/2014 | Redlich et al. | |
| 8,667,267 B1 | 3/2014 | Garcia et al. | |
| 8,713,046 B2 | 4/2014 | Vishnoi et al. | |
| 8,732,674 B1 | 5/2014 | Agha | |
| 8,788,815 B1 | 7/2014 | Garcia | |
| 8,821,602 B2 | 9/2014 | Kirkland et al. | |
| 8,892,599 B2 | 11/2014 | Lindblad et al. | |
| 9,342,557 B2 | 5/2016 | Kornacker | |
| 9,477,731 B2 | 10/2016 | Kornacker | |
| 9,679,012 B1 | 6/2017 | Dorin et al. | |
| 10,706,059 B2 | 7/2020 | Kornacker et al. | |
| 2002/0073322 A1 | 6/2002 | Park et al. | |
| 2003/0051036 A1 | 3/2003 | Wang et al. | |
| 2004/0117345 A1* | 6/2004 | Bamford | G06F 16/2386 |
| 2004/0186832 A1 | 9/2004 | Jardin | |
| 2005/0071708 A1 | 3/2005 | Bartfai et al. | |
| 2005/0108203 A1* | 5/2005 | Tang | H04L 69/329 |
| 2005/0171983 A1 | 8/2005 | Deo et al. | |
| 2005/0182749 A1 | 8/2005 | Matsui | |
| 2006/0050877 A1 | 3/2006 | Nakamura | |
| 2006/0143453 A1 | 6/2006 | Imamoto et al. | |
| 2006/0156018 A1 | 7/2006 | Lauer et al. | |
| 2006/0259909 A1* | 11/2006 | Passero | G06F 16/88 |
| | | | 719/312 |
| 2007/0113188 A1 | 5/2007 | Bales et al. | |
| 2007/0177737 A1 | 8/2007 | Jung et al. | |
| 2007/0180255 A1 | 8/2007 | Hanada et al. | |
| 2007/0186112 A1 | 8/2007 | Perlin et al. | |
| 2007/0226488 A1 | 9/2007 | Lin et al. | |
| 2007/0234115 A1 | 10/2007 | Saika | |
| 2007/0255943 A1 | 11/2007 | Kern et al. | |
| 2008/0104579 A1 | 5/2008 | Hartmann | |
| 2008/0140630 A1 | 6/2008 | Sato et al. | |
| 2008/0244307 A1 | 10/2008 | Dasari et al. | |
| 2008/0256486 A1 | 10/2008 | Hagiwara | |
| 2008/0263006 A1 | 10/2008 | Wolber et al. | |
| 2009/0177697 A1 | 7/2009 | Gao et al. | |
| 2009/0259838 A1 | 10/2009 | Lin | |
| 2009/0307783 A1 | 12/2009 | Maeda et al. | |
| 2010/0008509 A1 | 1/2010 | Matsushita et al. | |
| 2010/0010968 A1 | 1/2010 | Redlich et al. | |
| 2010/0094877 A1* | 4/2010 | Garbe | G06F 16/93 |
| | | | 707/742 |
| 2010/0131817 A1 | 5/2010 | Kong et al. | |
| 2010/0198972 A1 | 8/2010 | Umbehocker | |
| 2010/0296652 A1 | 11/2010 | Nakayama et al. | |
| 2010/0325713 A1 | 12/2010 | Kurita et al. | |
| 2011/0055578 A1 | 3/2011 | Resch | |
| 2011/0078549 A1 | 3/2011 | Thueringer et al. | |
| 2011/0179160 A1 | 7/2011 | Liu et al. | |
| 2011/0228668 A1 | 9/2011 | Pillai et al. | |
| 2011/0231431 A1* | 9/2011 | Kamiwada | G06F 16/335 |
| | | | 707/769 |
| 2011/0246826 A1 | 10/2011 | Hsieh et al. | |
| 2011/0276396 A1 | 11/2011 | Rathod | |
| 2011/0276495 A1 | 11/2011 | Varadarajan et al. | |
| 2011/0302417 A1 | 12/2011 | Whillock et al. | |
| 2012/0016901 A1 | 1/2012 | Agarwal et al. | |
| 2012/0036146 A1 | 2/2012 | Annapragada | |
| 2012/0036357 A1 | 2/2012 | Struik | |
| 2012/0130874 A1 | 5/2012 | Mane et al. | |
| 2012/0131341 A1 | 5/2012 | Mane et al. | |
| 2012/0310986 A1* | 12/2012 | Frantz | G06F 16/217 |
| | | | 707/792 |
| 2012/0317275 A1* | 12/2012 | Lee | H04L 67/104 |
| | | | 709/224 |
| 2013/0054976 A1 | 2/2013 | Brown et al. | |
| 2013/0117307 A1* | 5/2013 | Vishnoi | G06F 16/2343 |
| | | | 707/770 |
| 2013/0124466 A1 | 5/2013 | Naidu et al. | |
| 2013/0124483 A1* | 5/2013 | Furuhashi | G06F 16/258 |
| | | | 707/661 |
| 2014/0032593 A1* | 1/2014 | Libenzi | G06F 16/337 |
| | | | 707/769 |
| 2014/0114994 A1* | 4/2014 | Lindblad | G06F 16/2471 |
| | | | 707/756 |
| 2014/0188841 A1 | 7/2014 | Sun | |
| 2014/0195558 A1* | 7/2014 | Murthy | G06F 16/951 |
| | | | 707/770 |
| 2014/0222856 A1* | 8/2014 | Lakshminath | G06F 16/93 |
| | | | 707/769 |
| 2014/0280032 A1 | 9/2014 | Kornacker et al. | |
| 2015/0074151 A1 | 3/2015 | Chaiken et al. | |
| 2015/0095308 A1 | 4/2015 | Kuff et al. | |

OTHER PUBLICATIONS

Babaoglu, O., and K. Marzullo, "Consistent global states of distributed systems: Fundamental concepts and mechanisms," Distributed Systems, 53 pages, Jan. 1993.

Beomseok Nam et al: "Spatial indexing of distributed multidimensional datasets", Cluster Computing and the Grid, 2005. CCGRID 2005. IEEE International Symposium On Cardiff-Wales, UK May 9-12, 2005, Piscataway, NJ, USA,IEEE, Piscataway, NJ, USA, vol. 2, May 9, 2005, pp. 743-750.

Chapter 25: Distributed Databases ED—Ramez Elmasri; Shamkant B Navathe (eds), Jan. 1, 2011 (Jan. 1, 2011), Fundamentals of Database Systems (Sixth Edition), Addison-Wesley, pp. 877-927.

Cheng, Security Attack Safe Mobil and Cloud-Based One-Time Password Tokens Using Rubbing Encryption Algorithm, ACM, Jun. 2011, pp. 304-336.

Corbett et al., "Spanner: Google's Globally Distributed Database," Transactions on Computer Systems (TOCS), vol. 31, No. 3, 14 pages, Aug. 2013.

Distributed Parallel Search Function of TX1 XML Database Realizing High-Speed Searching of Tens of Terabytes of XML Data, Toshiba Tech Review, vol. 65, No. 1 (2010).

Du et al., "A Pairwise Key Predistribution Scheme for Wireless Sensor Networks," ACM, May 2005, vol. 8 Issue 2, pp. 228-258.

Kim et al., Design and Implementation of a Private and Public Key Crypto Processor and Its Applicaiton to a Security System, IEEE, Feb. 2004, vol. 50, Issue 1, pp. 214-224.

Ko et al., "A Study of Encryption Algorithm for RFID tag (SEED: 8 Rounds X 64 bit block)," IEEE, s008, pp. 672-677.

Kossmann D: "The State of the Art in Distributed Query Processing", ACM Computing Surveys, ACM, New York, NY, US, vol. 32, No. 4, Dec. 1, 2000, pp. 422-469.

Lamport, L., "Time, clocks, and the ordering of events in a distributed system," Communications of the ACM, vol. 21, No. 7, pp. 558-565, Jul. 1978.

Kornacker, M. et al.: "Cloudera Impala: Real-Time Queries in Apache Hadoop, For Real I Cloudera Engineering Blog", Oct. 24, 2012. Retrieved from Internet: http://blog.cloudera.com/blog/2012/10/cloudera-impala-real-time-queries-in-apache- hadoop-for-real/ [retrieved on Jun. 8, 2015].

Stoller, S.D., "Detecting global predicates in distributed systems with clocks," Distributed Computing, vol. 13, No. 2, pp. 85-98, Feb. 2000.

Tamer Ozsu et al: "Principles of Distributed Database Systems", Principles of Distributed Database Systems, XX, XX, Jan. 1, 1991 (Jan. 1, 1991), pp. 74-93.

(56) References Cited

OTHER PUBLICATIONS

Yotaro Nakayama "Realization of Virtual Data Integration Platform using PostgreSQL", Unisys Technology Review Mar. 2012; pp. 25-37. http://www.unisys.co.jp/tec_info/tr111/11103.pdf.
Canada Exam Report for application No. 2843459, dated Aug. 5, 2014, 3 pages.
Canada Exam Report for application No. 2843459, dated May 22, 2015, 3 pages.
Canada Examination Report for Canadian Application No. 2,912,038, dated Nov. 3, 2016, 3 pages.
European Search Report for European Application No. 14157984.7, dated Jun. 6, 2014, 10 pages.
European Examination Report for European Application No. 14157984.7, dated Jun. 16, 2015, 9 pages.
European Examination Report for European Application No. 14187188.9, dated Apr. 25, 2016, 15 pages.
Partial European Search Report for European Application No. 14187188.9; Applicant Cloudera, Inc. dated Feb. 6, 2015; pp. 7.
Extended European Search Report for European Application No. 14187188.9; Applicant Cloudera, Inc. dated Jul. 9, 2015; pp. 12.
Exam Report No. 1 for Australian Application No. 2014240211, dated Oct. 7, 2016.
Exam Report for GB1403929.1, Applicant: Cloudera, Inc, dated May 2, 2014, 6 pages.
Exam Report for GB1403929.1, Applicant: Cloudera, Inc, dated Jul. 17, 2015, 10 pages.
Exam Report for GB1417283.7, Applicant: Cloudera, Inc., dated Jan. 7, 2016, 6 pages.
Further Examination Report for GB1417283.7, dated May 17, 2016, 6 pages.
Japanese Application No. 2014-049703, Final Notification of Reasons for Rejection; dated Feb. 3, 2016, 3 pages (English translation).
Japanese Application No. 2014-049703, Final Notification of Reasons for Rejection; dated Mar. 4, 2015, 3 pages (English translation).
Non-Final Office Action for U.S. Appl. No. 13/362,695, dated Apr. 29, 2013, 23 pgs.
Non-Final Office Action for U.S. Appl. No. 16/921,640; Applicant Cloudera, Inc.; dated Sep. 1, 2021; 15 pgs.
Extended European Search Report for European Application No. 21167541.8; Applicant Cloudera, Inc.; dated Sep. 13, 2021; 11 pages.

\* cited by examiner

BACKGROUND FORMAT OPTIMIZATION FOR ENHANCED QUERIES IN A DISTRIBUTED COMPUTING CLUSTER

CROSS REFERENCE TO RELATED APPLICATION

This application is a continuation U.S. patent application Ser. No. 15/292,053, filed Oct. 12, 2016, entitled "BACKGROUND FORMAT OPTIMIZATION FOR ENHANCED SQL-LIKE QUERIES IN HADOOP," which is a continuation of U.S. patent application Ser. No. 14/043,753, filed Oct. 1, 2013, entitled "BACKGROUND FORMAT OPTIMIZATION FOR ENHANCED SQL-LIKE QUERIES IN HADOOP," (now U.S. Pat. No. 9,477,731) both of which are incorporated by reference in their entireties herein.

BACKGROUND

Apache Hadoop project (hereinafter "Hadoop") is an open-source software framework for developing software for reliable, scalable and distributed processing of large data sets across clusters of commodity machines. Hadoop includes a distributed file system, known as Hadoop Distributed File System (HDFS). HDFS links together the file systems on local nodes to form a unified file system that spans an entire Hadoop cluster. Hadoop also includes Hadoop YARN that provides a framework for job scheduling and cluster resource management that is utilized by a programming framework known as MapReduce. Hadoop is also supplemented by other Apache projects including Apache Hive (hereinafter "Hive") and Apache HBase (hereinafter "HBase"). Hive is a data warehouse infrastructure that provides data summarization and ad hoc querying. HBase is a scalable, distributed NoSQL (No Structured Query Language) database or data store that supports structured data storage for large tables.

Hadoop currently does not support a relational database management system (RDBMS). For a relational database, a schema—the organization of data into tables having specific columns together with a set of integrity constraints ensuring compatibility between the columns of the tables—can be defined. A typical RDBMS implements a schema-on-write model, where a schema is enforced on data as the data is written into the database. Specifically, the data is reorganized and filtered using the integrity constraints before the data is stored into the database. A schema-on-write model works well for answering known questions. If a previously unknown question needs to be answered, new data may need to be captured. However, the RDBMS cannot accept new data that does not match the schema. To accommodate the new data, typically old data needs to be deleted from the database, the schema needs to be modified, and new data needs to be parsed and loaded into the database. In addition, data architects typically need to ensure that all the systems connected to the RDBMS work with the updated schema. This process of accommodating the new data can take a long time. Until then, the new data cannot be captured to answer the previously unknown question.

On the other hand, Hadoop currently follows a schema-on-read model, where a schema is not enforced on data until the data is read from the database. In this case, a schema generally specifies an organization of data in terms of file formats. As a result, the processing of the data can be decoupled from the storage of the data. Specifically, the underlying storage system in Hadoop can take files in their original format (e.g., tab-delimited text files, CSV, XML, JSON, images, etc.), while allowing an associated schema to be designed later and stored separately. In response to a query, the stored data is then transformed in-memory according to the separately stored schema. By virtue of the schema-on-read model, input data can be quickly updated in the database, which encourages users to experiment with different schemas.

The schema-on-read model and the schema-on-write model have their distinct merits. It would be useful for Hadoop to offer users the flexibility of using either one or a combination of them depending on the specific needs and requirements.

DETAILED DESCRIPTION

The following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be, but not necessarily are, references to the same embodiment; and, such references mean at least one of the embodiments.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but no other embodiments.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way.

Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any exemplified term. Likewise, the disclosure is not limited to various embodiments given in this specification.

Without intent to further limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions will control.

Embodiments of the present disclosure include a format conversion engine for Hadoop. Embodiments of the present disclosure also include systems and methods for performing format conversion, in real time or near real time, on data stored in Hadoop.

In one embodiment, the format conversion engine provides a mechanism enabling fast searches by making data ready in an easily queryable format. In another embodiment, it provides users with the flexibility of being able to update data quickly and to work with stabilized data efficiently.

Figure 1:
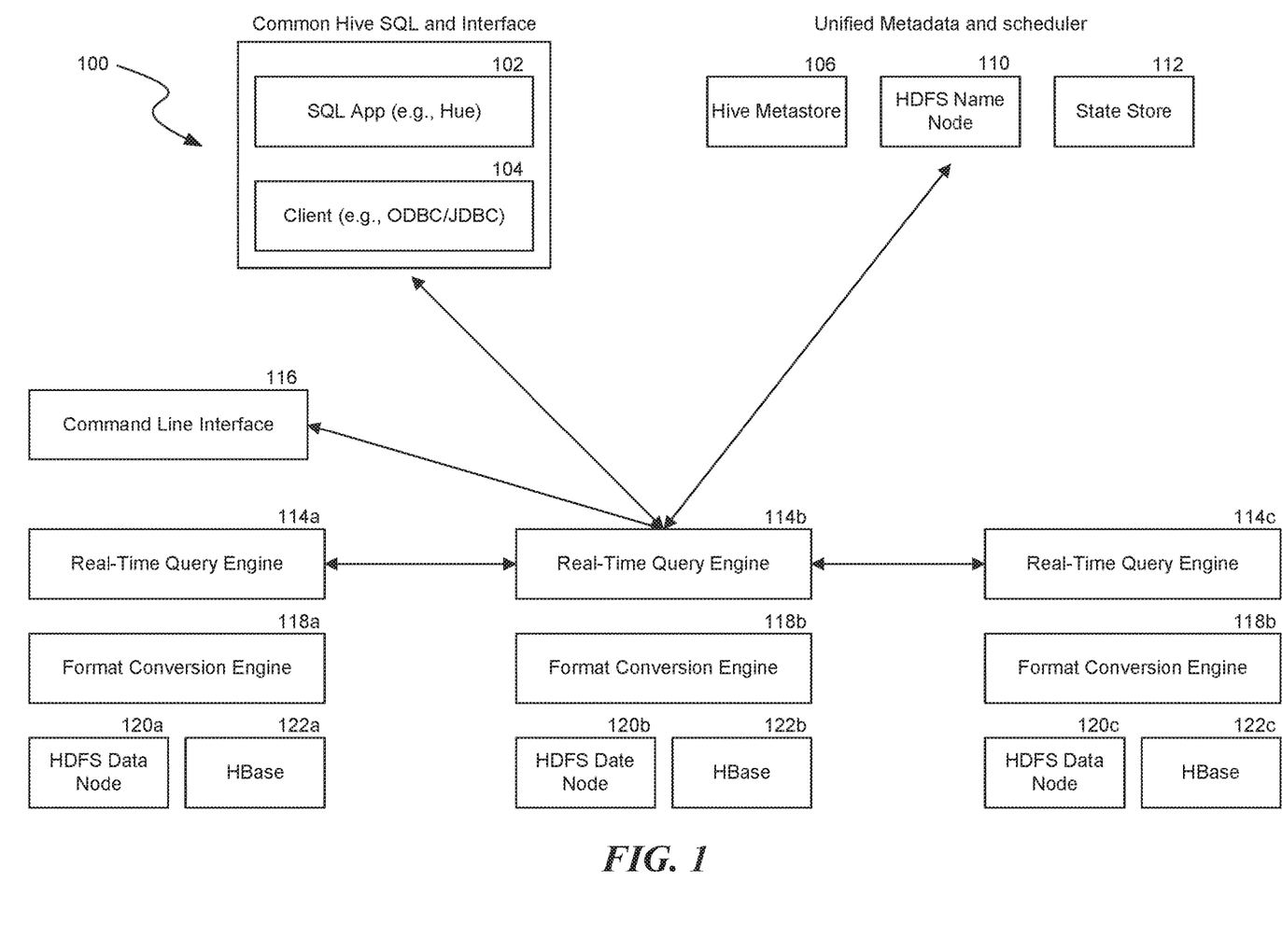
FIG. 1 contains a diagram illustrating an example environment in which a low latency query engine and a format conversion engine may be deployed.

FIG. 1 contains a diagram illustrating an example environment 100 in which a low latency (LL) query engine and a format conversion engine may be deployed. The environment 100 includes a plurality of data nodes 120a-c that comprise a Hadoop cluster. Some of the data nodes 120a-c may run just HDFS, while others may run H Base region servers 122a-c.

The environment 100 includes a client 104 such as Java Database Connectivity (JDBC) client, Open Database Connectivity (ODBC) client, and the like that provides API and other tools for connecting and/or accessing a Hadoop cluster. SQL applications 102 such as Hue, provide a user interface for Hadoop to run queries or jobs, browse the HDFS, create workflows and the like. The environment 100 also includes a command line interface 116 for issuing queries. In one embodiment, the client 104, the SQL application 102 and the command line interface 116, each or together may be commonly referred to as a client.

A low latency (LL) query engine daemon 114 a-c runs on each of the data nodes. A low latency (LL) query engine daemon is a long running process that coordinates and executes queries. Each low latency (LL) query engine daemon 114a-c can receive, plan and coordinate queries received via the client's 102/104. For example, a low latency (LL) query engine daemon can divide a query into fragments, which are distributed among remote nodes running additional low latency (LL) query engine daemons for execution in parallel. The queries are executed directly on the HDFS (e.g., 120a-c) and/or HBase (e.g., 122a-c).

A format conversion engine daemon 118a-c also runs on each of the data nodes. The format conversion engine daemon 118a-c is a long running process that converts data from its original format to a condensed format that is conducive to relational database processing, such as the columnar format Parquet. The conversion can be performed at one or more time points. The converted data is saved on the data node together with the original, unconverted data, both available to the low latency (LL) query engine.

The environment 100 further includes unified metadata components such as a Hive metastore 106, an HDFS name node 110 and/or a state store 112. The Hive metastore 106 includes information about the data available to the various engines within the environment 100. Specifically, the Hive metastore 106 includes the schemas for the data stored on the data nodes 120a-c. The HDFS name node (NN) 110 includes the details of the distribution of files across the data nodes 120a-c to optimize local reads. In one implementation, the name node 110 may include information concerning disk volumes the files sit on, on an individual node.

The state store 112 is a global system repository which runs on a single node in the cluster. The state store 112 in one implementation can be used as a name service. All low latency (LL) query engine daemons, at start up, can register with the state store to be a member and get existing membership information specifying all the low latency (LL) query engine daemons that are running on the cluster. The state store 112, in a further implementation, can be used to provide metadata for running queries. The state store 112 can cache metadata and distribute the metadata to the low latency (LL) query engine daemons at start up or another time. When the state store fails, the rest of the system may continue to operate based on last information received from the state store. In a further implementation, the state store can store and distribute other system information such as load information, diagnostics information, and the like that may be used to improve the functioning and/or performance of the Hadoop cluster.

Figure 2:
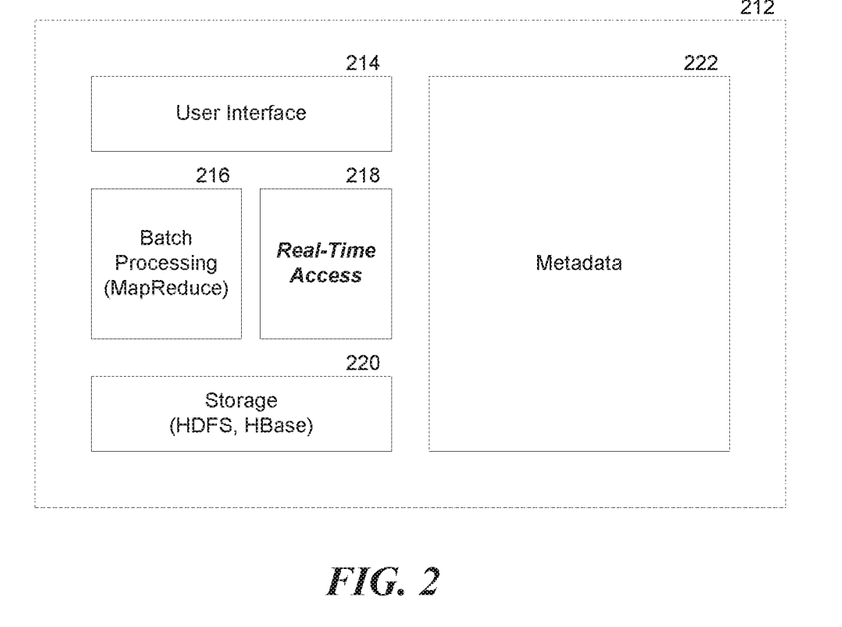
FIG. 2 contains a block diagram illustrating example components of a unified platform supporting batch-oriented and real-time, ad hoc queries.

FIG. 2 contains a block diagram illustrating example components of a unified Hadoop platform 212 supporting batch-oriented and real-time, ad hoc queries. The unified Hadoop platform 212 supports distributed processing and distributed storage. The unified Hadoop platform 212 includes a user interface 214, storage 220 and metadata 222 components. The user interface 214 includes Hive interfaces such as ODBC driver, JDBC driver, Hue Beeswax, and the like. The user interface 214 also includes SQL support. Via the user interface 214, queries can be issued, data can be read from or written to storage 220, etc. The storage 220 includes HDFS and/or HBase storage. The HDFS may support various file formats, including but not limited to: text file, sequence file, RC file, Avro, and the like. Various compression codecs including snappy, gzip, deflate, bzip, and the like may also be supported. The metadata 222 may include, for example, information about tables, their partitions, columns, types, table/block locations, and the like. The metadata 222 may leverage existing Hive metastore, which includes a mapping of HBase tables, predicates on row key columns mapped into start/stop row, predicates on other columns mapped into single column value filters, and the like.

Existing Hadoop platform uses a batch-oriented query engine (i.e., MapReduce) for batch processing 216 of Hadoop data. The batch processing capability of MapReduce is complemented by a real-time access component 218 in the unified Hadoop platform 212. The real-time access component 218 allows real-time, ad hoc SQL queries to be performed directly on the unified storage 220 via a distributed low latency (LL) query engine that is optimized for low-latency. The real-time access component 218 can thus support both queries and analytics on big data.

Figure 3:
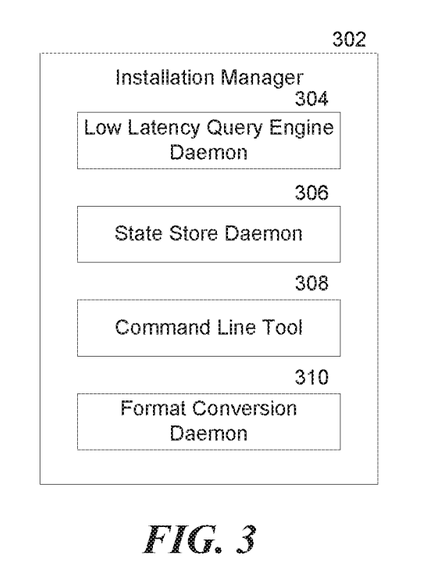
FIG. 3 contains a block diagram illustrating example components of an installation manager.

FIG. 3 contains a block diagram illustrating example components of an installation manager 302 for installing components of the various engines in a Hadoop cluster to provide interactive, real-time SQL queries directly on a unified storage layer. The installation manager 302 can automatically install, configure, manage and monitor the various engines. Alternately, the engines may be installed manually. The installation manger 302 installs four binaries including a low latency (LL) query engine daemon 304, a state store daemon 306, a low latency (LL) query engine shell 308 and a format conversion engine daemon 310. As described above, the low latency (LL) query engine daemon 304 is a service or process that plans and executes queries against HDFS and/or HBase data. It is installed on each data node in the cluster. The format conversion engine daemon is a service or process that converts data from its original format to a condensed format. It is also installed on each data node in the cluster. The state store daemon 306 is a name service that tracks the location and status of all the low latency (LL) query engine daemons in the cluster. The state store daemon 306 can also be a metadata store for providing metadata and/or other diagnostic information in some implementations. The low latency (LL) query engine shell 308 is a command line interface for issuing queries to a low latency (LL) query engine daemon, and is installed on a client.

Figure 4:
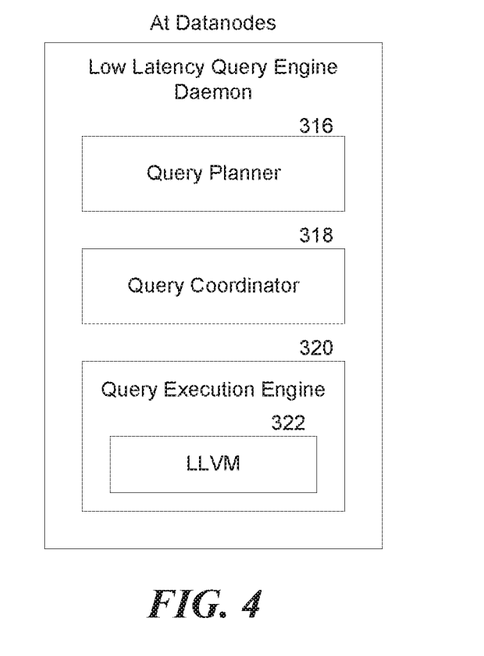
FIG. 4 contains a block diagram illustrating example components of a low latency (LL) query engine daemon installed on each data node in a Hadoop cluster.

FIG. 4 contains a block diagram illustrating example components of a low latency (LL) query engine daemon installed on each data node in a Hadoop cluster. A low latency (LL) query engine daemon includes a query planner 316, a query coordinator 318 and a query execution engine 320 in one embodiment.

The query planner 316 turns query requests from clients into collections of plan fragments based on stored schemas, and provides the plan fragments to the query coordinator 318. The query planner 316 may constitute the front end of the low latency (LL) query engine daemon written in Java or another suitable language to facilitate interaction with the rest of the Hadoop environment, such as the Hive metastore, the state store, APIs, and the like. The query planner 316 can use various operators such as Scan, HashJoin, HashAggregation, Union, TopN, Exchange, and the like to construct a query plan. Each operator can either materialize or generate data or combine data in some way. In one implementation, for example, the query planner can create a lefty plan or tree of one or more operators (e.g., manually or using an optimizer). The scan operator allows a plan to be broken up along scan lines or boundaries. Specialized scan nodes may be present for different storage managers. For example, there may be an HDFS scan node and an HBase scan node, each of which can internally employ different processes for different file formats. Some plans combine data for hash aggregation which can fill up a hash table and then output the aggregate results. A union operator can merge the output from different plan fragments. A TopN operator can be the equivalent of order by with a limit. The exchange operator can handle the data exchange between two plan fragments running on two different nodes.

The query coordinator 318 initiates execution of the plan fragments across all the low latency (LL) query engine daemons that are involved in the query. The query coordinator 318 uses the membership information from the state store and/or the location information for the data blocks from HDFS the Name Node to determine or identify the low latency (LL) query engine daemons for executing query plan fragments. In one implementation, the query coordinator 318 can also apply any predicates from the query to narrow down to the set of files and blocks against which the plan fragments should be run. The query coordinator 318 can also perform the final aggregation or merge of data from the low latency (LL) query engine daemons on remote data nodes. In one implementation, the low latency (LL) query engine daemons may pre-aggregate some of the data, thereby distributing the aggregation across the data nodes and speeding up the query processing.

The query execution engine 320 executes the planned query fragments locally on the HDFS and HBase. For example, it runs the scan and/or any other query operators. The query execution engine 320 is written in C++, but may also be written in any other suitable language, such as Java. The query execution engine 320 is an execution engine that is separate from MapReduce. While the query execution engine 320 accesses the infrastructure that provides the data (e.g., HDFS and HBase), it does not utilize any of the infrastructures that support map reductions, such as job trackers and task trackers.

In one embodiment, initially, data comes in and is stored in their original format on the HDFS data nodes. One or more associated schemas comprising information on file formats in which data is stored, which can be created by a user or an administrator, are saved separately in the Hive metastore 106, at the same time as the data is stored or at a later time. In one embodiment, after a query is submitted, a query execution engine 320 on a data node which is to execute certain planned query fragments locally first transforms the files on the data node according to the schemas. Specifically, the query execution engine 320 reads a schema, which contains information on row and column endings, for example, for the files from the Hive metastore. It then reads the files from the data node, parses them in accordance with the file formats specified in the schema, and transforms the parsed data into a series of in-memory tuples according to further information in the schema. At that time, the query execution engine 320 is ready to execute the planned query fragments locally against the transformation result.

In one embodiment, the query execution engine 320 can include a low level virtual machine (LLVM) 322, an optimizer, or other compiler infrastructure, for run-time code generation in order to transform interpretive code into a format that can be efficiently executed by the central processing unit (CPU). A typical RDBMS, for instance, has interpretive code for evaluating expressions to extract data from indices and the like. The query execution engine 320 handles this issue by using low level virtual machines (LLVMs) to more tightly couple code with hardware. For example, an expression where A equals B over A+B equals C in a query can be evaluated by making three function calls. Instead of making the three function calls, an LLVM uses the operations that the CPU provides in order to evaluate the expression and achieve speed gains.

In a further embodiment, the low latency (LL) query engine daemon can also use special CPU instructions, in order to, for example, perform text processing and/or other resource intensive processes. By way of another example, hash value computations may be performed using a special Cyclic Redundancy Check (CRC32) instruction to achieve speed gains.

In one embodiment, the low latency (LL) query engine provides the advantage of low latency which allows users to query large volumes of data and obtain answers at much faster speed than possible using the existing batch processing framework of Hive and MapReduce. In a further embodiment, the real-time query engine provides flexibility in applying schemas used to search for hidden insights in large volumes of data.

Figure 5:
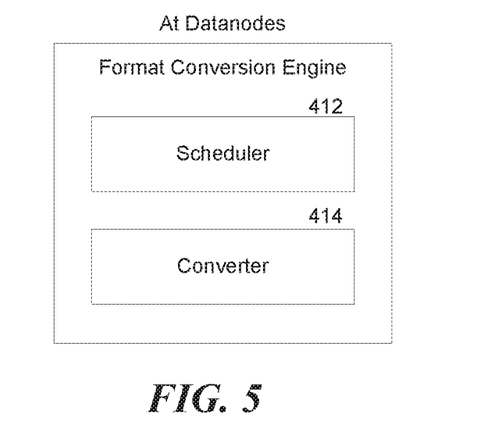
FIG. 5 contains a block diagram illustrating example components of a format conversion engine daemon installed on each data node in a Hadoop cluster.

It takes different amounts of time for a query execution engine to parse and transform data in different file formats. In general, the amount of time decreases when the file format is more conducive to relational database processing in response to SQL-like queries. Therefore, a format conversion engine converts data to such a file format in the background to increase the efficiency of query processing at runtime. FIG. 5 contains a block diagram illustrating example components of a format conversion engine daemon installed on each data node in a Hadoop cluster. In one embodiment, the format conversion engine daemon includes a scheduler 412 and a converter 414. The scheduler 412 determines when to perform the format conversion based on input by an administrator or a user, and notifies the converter when the time comes. In one example, the scheduler 412 uses a timer for performing the format conversion periodically or at certain points in the future. The certain point in the future could be measured from the occurrence of an event, such as the creation, initial update, or last update of the data. In other examples, the conversion is performed when the data has been updated, searched, searched with the same queries, and so on, for a certain number of times. Accordingly, the scheduler 412 keeps a counter of the total number of updates, of all queries, of specific queries, of distinct queries, and so on, so that the format conversion can be performed when the criteria involving these numbers are met. In further examples, the status of resource utilization on the data node is taken into consideration in scheduling the format conversion.

In one embodiment, the scheduler 412 maintains one schedule for each piece of data on the data node, for each original format, for each target format, for each pair of an original format and a target format, etc. In another embodiment, the scheduler 412 determines when to delete the conversion results from the data node, which can be similar to the determination of when to perform the format conversion, and notifies the converter 414 when the time comes. While a scheduler 412 of a format conversion engine daemon may work independently, it can also coordinate with the scheduler of another format conversion engine daemon to perform the format conversion in a systematic fashion across multiple data nodes or even the entire cluster.

The converter 414 performs the format conversion upon receiving a notification from the scheduler 412. In one embodiment, the converter 414 maintains a list of one or more target formats. It converts the data on the data node to one of the target formats based on input by an administrator a user, and saves the converted data on the data node along with the original data. For example, the converter 414 may read a file in the CSV format from the data node into memory, parse the file in accordance with the CSV format, convert it into a chosen Parquet format, and saves the file in the Parquet format on the data node together with the file in the CSV format. In one embodiment, the conversion may be fully automated between certain original formats and target formats, possibly based on specific schemas stored in the Hive metastore. For instance, every field in a CSV file can be automatically converted into a column in a Parquet file. The conversion may also be customized by an administrator or a user, who may decide to convert an input file into multiple output files in the same target format or different ones, each having select fields in the input file arranged in a specific order, for example. In another embodiment, the converter 414 also deletes certain conversion results upon receiving a notification from the scheduler 412.

As a target format is typically a condensed format that is conducive to relational database processing, having data ready in a target format speeds up processing of SQL-like queries. As the format conversion is performed at carefully selected time points in the background, it tends to minimize the use of resources and interference with other operations on the data nodes.

With the format conversion engine daemon, in one embodiment, after a query is submitted, a query planner would set up the plan fragments to indicate that converted data is available. The query execution engine on a data node then no longer needs to perform a complex transformation of the data on the data node. It can simply read the converted data from the data node, which would essentially be in a tuple form. The format conversion engine daemon therefore provides some benefits of the schema-on-write model by reducing the processing time when the data is used in query processing, without suffering some costs of the model, which requires a large processing time when the data is uploaded and updated.

Figure 6:
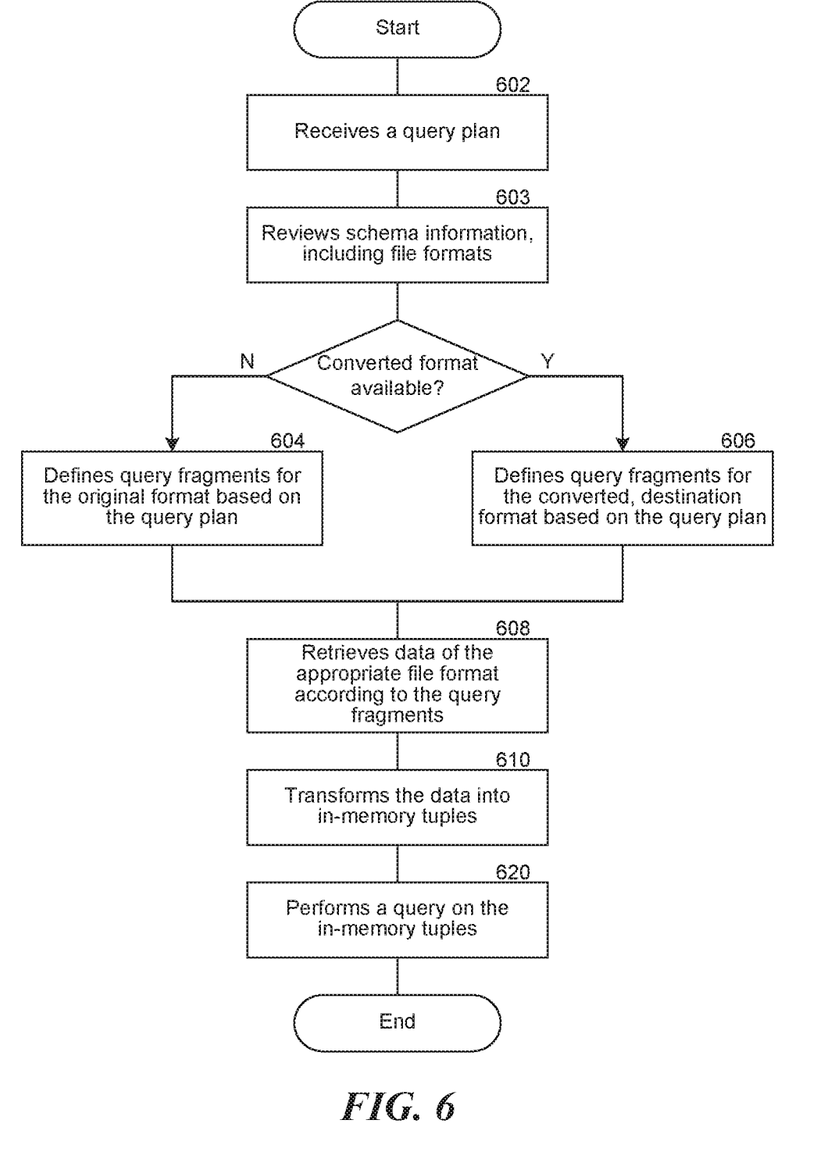
FIG. 6 contains a flow diagram illustrating example operation of a query execution engine before it executes a collection of query fragments.

FIG. 6 contains a flow diagram illustrating example operations of query planning and execution in the presence of a format conversion engine. At step 602, a query planner receives a query. At step 603, the query planner reviews relevant schema information to identify the available file formats in which data is stored. If only data in an original format is available, at step 604, the query planner defines plan fragments for the original format. If data in a converted target format is also available, however, at step 606, the query planner defines plan fragments for the target format. Upon receiving a collection of planned query fragments, at step 608, a query execution engine on a data node reads data in the appropriate file format from the data node. At step 610, the query execution engine transforms the data into a series of in-memory tuples according to the schema information. At step 612, the query execution engine executes the collection of planned query fragments using the in-memory tuples. By virtue of these features, a user is given the flexibility of being able to experiment with datasets having different structures without incurring much overhead in data upload and update while being able to extract specific insight from the datasets in an efficient manner.

Figure 7:
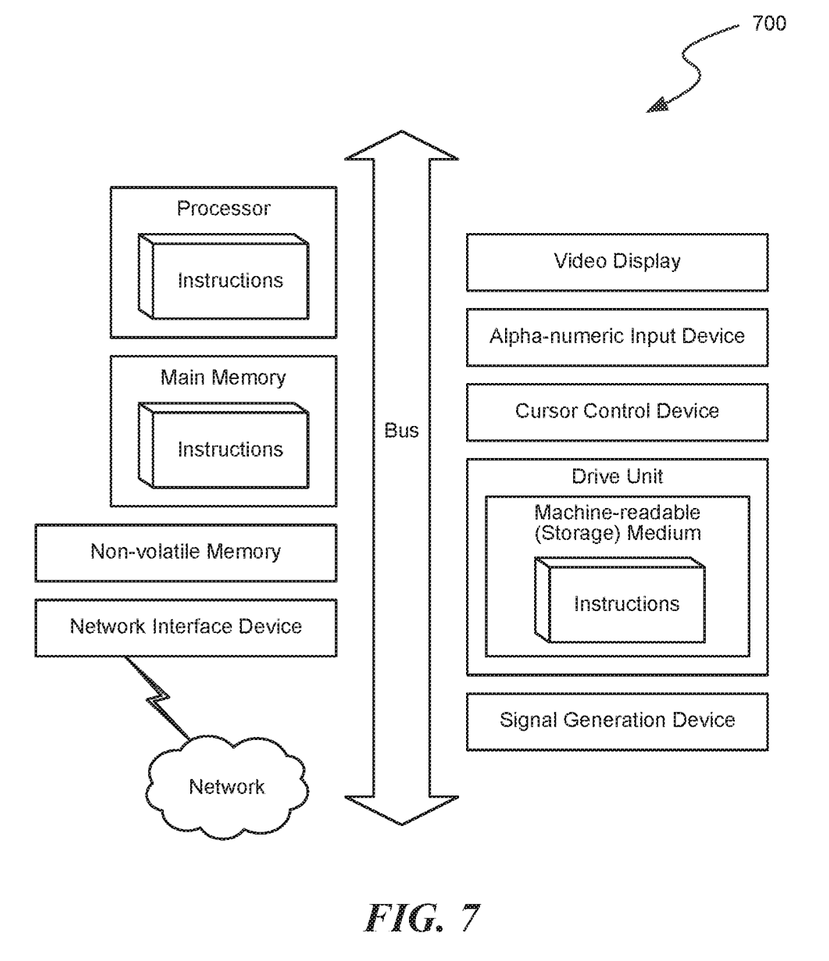
FIG. 7 depicts a diagrammatic representation of a machine in the example form of a computer system within which a set of instructions, for causing the machine to perform any one or more of the methodologies discussed herein, may be executed.

FIG. 7 shows a diagrammatic representation of a machine in the example form of a computer system within which a set of instructions, for causing the machine to perform any one or more of the methodologies discussed herein, may be executed.

In the example of FIG. 7, the computer system 700 includes a processor, memory, non-volatile memory, and an interface device. Various common components (e.g., cache memory) are omitted for illustrative simplicity. The computer system 700 is intended to illustrate a hardware device on which any of the components depicted in the example of FIG. 1 (and any other components described in this specification) can be implemented. The computer system 700 can be of any applicable known or convenient type. The components of the computer system 700 can be coupled together via a bus or through some other known or convenient device.

The processor may be, for example, a conventional microprocessor such as an Intel Pentium microprocessor or Motorola power PC microprocessor. One of skill in the relevant art will recognize that the terms "machine-readable (storage) medium" or "computer-readable (storage) medium" include any type of device that is accessible by the processor.

The memory is coupled to the processor by, for example, a bus. The memory can include, by way of example but not limitation, random access memory (RAM), such as dynamic RAM (DRAM) and static RAM (SRAM). The memory can be local, remote, or distributed.

The bus also couples the processor to the non-volatile memory and drive unit. The non-volatile memory is often a magnetic floppy or hard disk, a magnetic-optical disk, an optical disk, a read-only memory (ROM), such as a CD-ROM, EPROM, or EEPROM, a magnetic or optical card, or another form of storage for large amounts of data. Some of this data is often written, by a direct memory access process, into memory during execution of software in the computer 800. The non-volatile storage can be local, remote, or distributed. The non-volatile memory is optional because systems can be created with all applicable data available in memory. A typical computer system will usually include at least a processor, memory, and a device (e.g., a bus) coupling the memory to the processor.

Software is typically stored in the non-volatile memory and/or the drive unit. Indeed, for large programs, it may not even be possible to store the entire program in the memory. Nevertheless, it should be understood that for software to run, if necessary, it is moved to a computer readable location appropriate for processing, and for illustrative purposes, that location is referred to as the memory in this paper. Even when software is moved to the memory for execution, the processor will typically make use of hardware registers to store values associated with the software, and local cache that, ideally, serves to speed up execution. As used herein, a software program is assumed to be stored at any known or convenient location (from non-volatile storage to hardware registers) when the software program is referred to as "implemented in a computer-readable medium." A processor is considered to be "configured to execute a program" when at least one value associated with the program is stored in a register readable by the processor.

The bus also couples the processor to the network interface device. The interface can include one or more of a modem or network interface. It will be appreciated that a modem or network interface can be considered to be part of the computer system. The interface can include an analog modem, isdn modem, cable modem, token ring interface, satellite transmission interface (e.g. "direct PC"), or other interfaces for coupling a computer system to other computer systems. The interface can include one or more input and/or output devices. The I/O devices can include, by way of example but not limitation, a keyboard, a mouse or other pointing device, disk drives, printers, a scanner, and other input and/or output devices, including a display device. The display device can include, by way of example but not limitation, a cathode ray tube (CRT), liquid crystal display (LCD), or some other applicable known or convenient display device. For simplicity, it is assumed that controllers of any devices not depicted in the example of FIG. 8 reside in the interface.

In operation, the computer system 800 can be controlled by operating system software that includes a file management system, such as a disk operating system. One example of operating system software with associated file management system software is the family of operating systems known as Windows® from Microsoft Corporation of Redmond, Wash., and their associated file management systems. Another example of operating system software with its associated file management system software is the Linux operating system and its associated file management system. The file management system is typically stored in the non-volatile memory and/or drive unit and causes the processor to execute the various acts required by the operating system to input and output data and to store data in the memory, including storing files on the non-volatile memory and/or drive unit.

Some portions of the detailed description may be presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The algorithms and displays presented herein are not inherently related to any particular computer or other apparatus. Various general purpose systems may be used with programs in accordance with the teachings herein, or it may prove convenient to construct more specialized apparatus to perform the methods of some embodiments. The required structure for a variety of these systems will appear from the description below. In addition, the techniques are not described with reference to any particular programming language, and various embodiments may thus be implemented using a variety of programming languages.

In alternative embodiments, the machine operates as a standalone device or may be connected (e.g., networked) to other machines. In a networked deployment, the machine may operate in the capacity of a server or a client machine in a client-server network environment, or as a peer machine in a peer-to-peer (or distributed) network environment.

The machine may be a server computer, a client computer, a personal computer (PC), a tablet PC, a laptop computer, a set-top box (STB), a personal digital assistant (PDA), a cellular telephone, an iPhone, a Blackberry, a processor, a telephone, a web appliance, a network router, switch or bridge, or any machine capable of executing a set of instructions (sequential or otherwise) that specify actions to be taken by that machine.

While the machine-readable medium or machine-readable storage medium is shown in an exemplary embodiment to be a single medium, the term "machine-readable medium" and "machine-readable storage medium" should be taken to include a single medium or multiple media (e.g., a centralized or distributed database, and/or associated caches and servers) that store the one or more sets of instructions. The term "machine-readable medium" and "machine-readable storage medium" shall also be taken to include any medium that is capable of storing, encoding or carrying a set of instructions for execution by the machine and that cause the machine to perform any one or more of the methodologies of the presently disclosed technique and innovation.

In general, the routines executed to implement the embodiments of the disclosure, may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processing units or processors in a computer, cause the computer to perform operations to execute elements involving the various aspects of the disclosure.

Moreover, while embodiments have been described in the context of fully functioning computers and computer systems, those skilled in the art will appreciate that the various embodiments are capable of being distributed as a program product in a variety of forms, and that the disclosure applies equally regardless of the particular type of machine or computer-readable media used to actually effect the distribution.

Further examples of machine-readable storage media, machine-readable media, or computer-readable (storage) media include but are not limited to recordable type media such as volatile and non-volatile memory devices, floppy and other removable disks, hard disk drives, optical disks (e.g., Compact Disk Read-Only Memory (CD ROMS), Digital Versatile Disks, (DVDs), etc.), among others, and transmission type media such as digital and analog communication links.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above detailed description of embodiments of the disclosure is not intended to be exhaustive or to limit the teachings to the precise form disclosed above. While specific embodiments of, and examples for, the disclosure are described above for illustrative purposes, various equivalent modifications are possible within the scope of the disclosure, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed in parallel, or may be performed at different times. Further any specific numbers noted herein are only examples: alternative implementations may employ differing values or ranges.

The teachings of the disclosure provided herein can be applied to other systems, not necessarily the system described above. The elements and acts of the various embodiments described above can be combined to provide further embodiments.

Any patents and applications and other references noted above, including any that may be listed in accompanying filing papers, are incorporated herein by reference. Aspects of the disclosure can be modified, if necessary, to employ the systems, functions, and concepts of the various references described above to provide yet further embodiments of the disclosure.

These and other changes can be made to the disclosure in light of the above Detailed Description. While the above description describes certain embodiments of the disclosure, and describes the best mode contemplated, no matter how detailed the above appears in text, the teachings can be practiced in many ways. Details of the system may vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features, or aspects of the disclosure with which that terminology is associated. In general, the terms used in the following claims should not be construed to limit the disclosure to the specific embodiments disclosed in the specification, unless the above Detailed Description section explicitly defines such terms. Accordingly, the actual scope of the disclosure encompasses not only the disclosed embodiments, but also all equivalent ways of practicing or implementing the disclosure under the claims.

What is claimed is:

1. A method of data processing for query execution, the method being performed by a first query engine running on a first data node of a plurality of data nodes which together form a distributed computing cluster, wherein a query is processed by whichever data node receives the query, the method comprising:

storing, by the first query engine of the first data node, initial data in an original format at the first data node, each data node of the plurality of data nodes functioning as a peer in a peer-to-peer network of the distributed computing cluster and being capable of interacting with components of the distributed computing cluster, wherein each data node has a query engine running in memory at the first data node, the query engine configured to aggregate data processed at other data nodes in the peer-to-peer network during execution of a query;

converting, at the first data node, the initial data to be in a target format that is configured for relational database processing according to a predetermined schedule; and storing the converted data at the first data node.

2. The method of claim 1, further comprising:
receiving a set of one or more query fragments after the converted data is stored;
transforming the converted data in response to the receipt; and
executing the set of one or more query fragments on the transformed data.

3. The method of claim 2, wherein the set of one or more query fragments are executed on the first data node.

4. The method of claim 1, wherein the predetermined schedule is periodic.

5. The method of claim 1, wherein the predetermined schedule is based on a number of sets of query fragments that have been received.

6. The method of claim 1, further comprising:
storing new data in the original format to replace the initial data,
wherein the predetermined schedule is based on a number of times stored data in the original format has been replaced.

7. The method of claim 1, wherein the target format is a columnar format.

8. The method of claim 1, wherein the converted data is stored together with the initial data.

9. The method of claim 1, wherein the distributed computing cluster is a Hadoop™ cluster.

10. A system for data processing for query execution, the system having a plurality of data nodes which together form a distributed computing cluster, each data node of the plurality of data nodes having an instance of a query engine, wherein a query is processed by whichever data node that receives the query, and wherein the plurality of data nodes include:
one or more memory modules configured to:
store, by a first query engine of a first data node, initial data in an original format at the first data node, each data node in the plurality of data nodes functioning as a peer in a peer-to-peer network and being capable of interacting with components of the distributed computing cluster, each data node having the instance of the query engine running in memory, the query engine configured to aggregate data processed at other data nodes in the peer-to-peer network during execution of a query;
one or more processors configured to:
convert the initial data to be in a target format that is configured for relational database processing according to a predetermined schedule; and
the one or more memory modules further configured to:
store the converted data at the first data node.

11. The system of claim 10, wherein the one or more processors are further configured to:
receive a set of one or more query fragments after the converted data is stored;
transform the converted data in response to the receipt; and
execute the set of one or more query fragments on the transformed data.

12. The system of claim 10,
wherein the one or more memory modules are further configured to: store new data in the original format to replace the initial data; and
wherein the predetermined schedule is based on a number of times stored data in the original format has been replaced.

13. The system of claim 10, wherein the target format is a columnar format.

14. The system of claim 10, wherein the predetermined schedule is periodic.

15. The system of claim 10, wherein the system is a node in the distributed computing cluster.

16. A non-transitory machine-readable storage medium having stored thereon instructions which when executed by one or more processors perform a method, the method being performed by a first query engine running on a first data node of a plurality of data nodes which together form a distributed computing cluster, wherein a query is processed by whichever data node receives the query, the method comprising:
storing, by the first query engine of the first data node, initial data in an original format at the first data node, each data node of the plurality of data nodes functioning as a peer in a peer-to-peer network and being capable of interacting with components of the distributed computing cluster, each data node having a query engine instance running in memory at the data node, the query engine instance configured to aggregate data processed at other data nodes in the peer-to-peer network during execution of a query;
converting, at the first data node, the initial data to be in a target format that is configured for relational database processing according to a predetermined schedule; and
storing the converted data at the first data node.

17. The non-transitory machine-readable storage medium of claim 16, the method further comprising:
receiving a set of one or more query fragments after the converted data is stored;
transforming the converted data in response to the receipt; and
executing the set of one or more query fragments on the transformed data.

18. The non-transitory machine-readable storage medium of claim 16, the method further comprising:
storing new data in the original format to replace the initial data,
wherein the predetermined schedule is based on a number of times stored data in the original format has been replaced.

19. The machine-readable storage medium of claim 16, wherein the target format is a columnar format.

20. The machine-readable storage medium of claim 16, wherein the predetermined schedule is based on a number of sets of query fragments that have been received.

* * * * *